Figure 1:
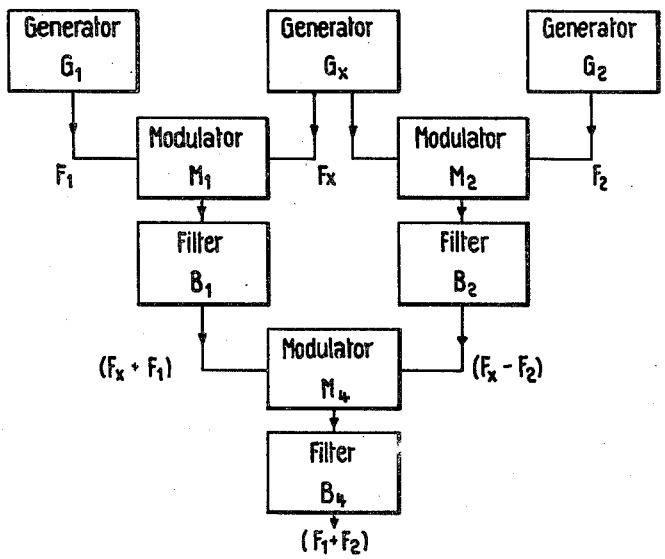

INVENTOR
Wladimir Ianouchewsky
BY
ATTORNEY

INVENTOR
Wladimir Janouchewsky
BY
Edward Connors
ATTORNEY

United States Patent Office 2,781,450
Patented Feb. 12, 1957

2,781,450

METHOD FOR FORMING A LINEAR COMBINATION OF FREQUENCIES AND APPARATUS FOR CARRYING OUT THIS METHOD

Wladimir Ianouchewsky, Paris, France, assignor to Ebauches S. A., Neuchatel, Switzerland Application April 30, 1953, Serial No. 352,129

Claims priority, application France May 14, 1952

10 Claims. (Cl. 250—36)

This invention concerns a method for forming from a series of frequencies differing each by little from a mean frequency, a linear combination, in particular the sum or a mean of said frequencies.

This invention is also concerned with an apparatus for carrying out this method.

It is usual in high precision measurements to measure the same value with a number of separate gauges, because the value measured by one gauge only is subject to accidental errors due to the accidental variations of the gauge. If, however, the mean value of measurements carried out by a number of separate gauges is taken, the probable accidental error of the result will be smaller than the accidental error occurring in the result of a measurement by one gauge only. If the gauges are identical the result will be the arithmetical mean of the different single measurements, whereas in case of gauges with different characteristics it may be of interest to form a mean wherein the different measurements are given different weight. If e. g. the measurements by $n$ gauges of the same value are $m_1, m_2, \ldots, m_n$ it may be of interest to take the following mean vallue $m$ of the measurements:

$$m = a_1 m_1 + a_2 m_2 + \ldots + a_n m_n$$

wherein $$a_1 + a_2 + \ldots + a_n = 1$$

and whereby $a_1, a_2, \ldots, a_n$ are the coefficients or weights attached to the corresponding gauges.

The same result might advantageously be obtained by one single measurement with a gauge the size or value of which equals the mean of the values $u_1, u_2, \ldots u_n$ of the different gauges having the same nominal value or size.

This invention is concerned with frequency generators and more particularly with a method for forming from a series of frequencies the sum and/or the mean frequency. According to the invention it is possible to form automatically from $n$ frequency generators with the frequencies $f_1, f_2, \ldots f_n$ respectively (these frequencies differing but little from the nominal frequencies of the generators) a frequency $$F_m = a_1 f_1 + a_2 f_2 + \ldots + a_n f_n \qquad (1)$$

wherein there is no restriction for the coefficients $a_1, a_2, a_3, \ldots a_n$ except for they must be rational numbers, that is they are to be the quotient of two integers $$a_1 = \frac{A_1}{B_1}, \quad a_2 = \frac{A_2}{B_2}, \quad \ldots \quad a_n = \frac{A_n}{B_n}$$

wherein $A_1, A_2, \ldots A_n$ and $B_1, B_2, \ldots B_n$ are integers. This restriction is of purely formal character and means no limitation from a physical point of view of the generality of Equation 1 and for the application of the invention In a first form of the invention a frequency is multiplied and/or divided in a first stage by integers in frequency multipliers and frequency dividers of well known type, thereby producing from a frequency $f$ a new frequency $$F = \frac{A}{B} f$$

whereby the coefficients $A$ and $B$ are integers. Practically the frequency $f$ is first multiplied by $A$ in a frequency multiplier of the ratio $A$ and then divided by $B$ in a frequency divider of the ratio $B$.

If $$F_1 = a_1 f_1, \quad F_2 = a_2 f_2, \quad \ldots, \quad F_n = a_n f_n$$

Equation 1 may be written as follows:

$$F_m = F_1 + F_2 + \ldots + F_n \qquad (2)$$

It is now possible to form in a second stage the sum of the $n$ frequencies $F_1, F_2, \ldots F_n$ obtained each from the frequencies $f_1, f_2, \ldots f_n$ in the first stage by multiplication and/or division $$\left( \text{e. g. } F_1 = \frac{A_1}{B_1} f_1 \right)$$

In certain forms of this invention the frequency generators are identical in which case all the frequencies $f_1, f_2, \ldots f_n$ have the same nominal value $f$ and the coefficients $a_1, a_2, \ldots a_n$ all equal $$\frac{1}{n}$$

In this case according to a second form of this invention the sum of the frequencies $f_1 + f_2 + \ldots + f_n$ is formed in a first stage and this sum is divided by $n$ in a second stage.

It is seen that in the above mentioned forms of the invention the sum of a series of frequencies is formed, which are either of the same nominal value and differing in fact very little from each other, or which are integral multiples or integral parts of another frequency of the series.

According to this invention an auxiliary frequency is required for forming the sum of several frequencies, which is in no simple relationship to one of the frequencies to be added. In general the auxiliary frequency will be chosen much higher than the highest of the frequencies to be added.

In order to form the sum of $n$ frequencies $F_1, F_2, \ldots F_n$ it is sufficient to know how to sum up two frequencies, e. g. $F_1$ and $F_2$. The resulting frequency may then be added to a third frequency, e. g. $F_3$ and so on step by step until all the frequencies are summed up. Making use of the associative law of the addition partial sums may be formed and these partial sums may again be summed up in order to form the whole sum.

In order to form the sum of two frequencies $F_1$ and $F_2$ the auxiliary frequency $F_x$ which is much higher than any of the frequencies $F_1$ and $F_2$ is modulated by the frequencies $F_1$ and $F_2$ separately, whereby the following frequency spectrums are produced:

$$F_x - F_1, \ F_x, \ F_x + F_1$$

and $$F_x - F_2, \ F_x, \ F_x + F_2$$

By means of a band pass filter or of a high pass filter the frequency $F_x + F_1$ is isolated from the first spectrum and by means of a band pass filter or of a low pass filter the frequency $F_x - F_2$ is isolated from the second spectrum. The isolated frequency $F_x + F_1$ is then modulated by the isolated frequency $F_x - F_2$ whereby the following third spectrum is produced:

$$F_1 + F_2, \ F_x - F_2, \ F_x + F_1, \ 2F_x + F_1 - F_2$$

from which the frequency $F_1 + F_2$ is isolated by means of a low pass filter or of a band pass filter.

Exactly the same result would have been obtained by isolating first the frequencies $F_x-F_1$ and $F_x+F_2$ by means of suitable filters and to modulate these frequencies in a second stage.

It is an important advantage of this invention that the auxiliary frequency $F_x$ must not be stabilized because it has no influence on the result as may be seen from the above formulas.

If a relatively great number of $n$ frequencies $F_1$, $F_2$, ..., $F_n$ are to be added up, this is advantageously done in making use of the associative law of the addition in order to economize modulators and filters. Thereby the frequencies are first added by pairs as follows: $(F_1+F_2)$, $(F_3+F_4)$, ..., $(F_{(n-1)}+F_n)$ if $n$ is even, and $(F_1+F_2)$, $(F_3+F_4)$, ... $F_n$ if $n$ is odd. This new series of frequencies obtained by adding pairs of the fundamental frequencies are again combined in pairs, and so on until two partial sums may be combined in a last modulator in order to make the total sum.

Some possibilities of carrying out the invention are described below by way of example and having reference to the drawings in which Fig. 1 is a diagram showing the elements of an apparatus for adding up two frequencies $F_1$ and $F_2$.

Figure 2:
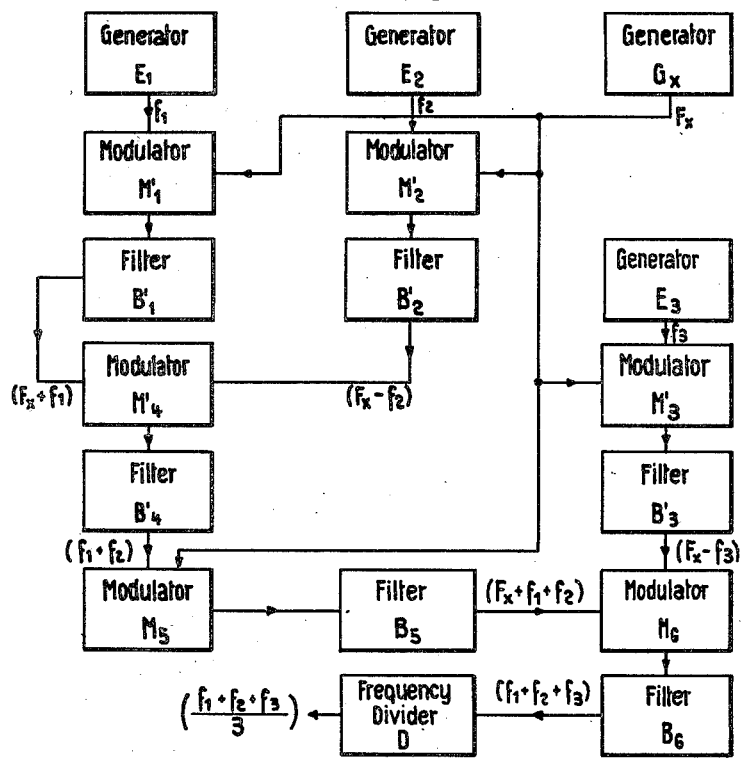

Fig. 2 is a diagram showing the elements of an apparatus for forming the mean $$\frac{f_1+f_2+f_3}{3}$$

of three frequencies $f_1$, $f_2$, and $f_3$, and

Figure 3:
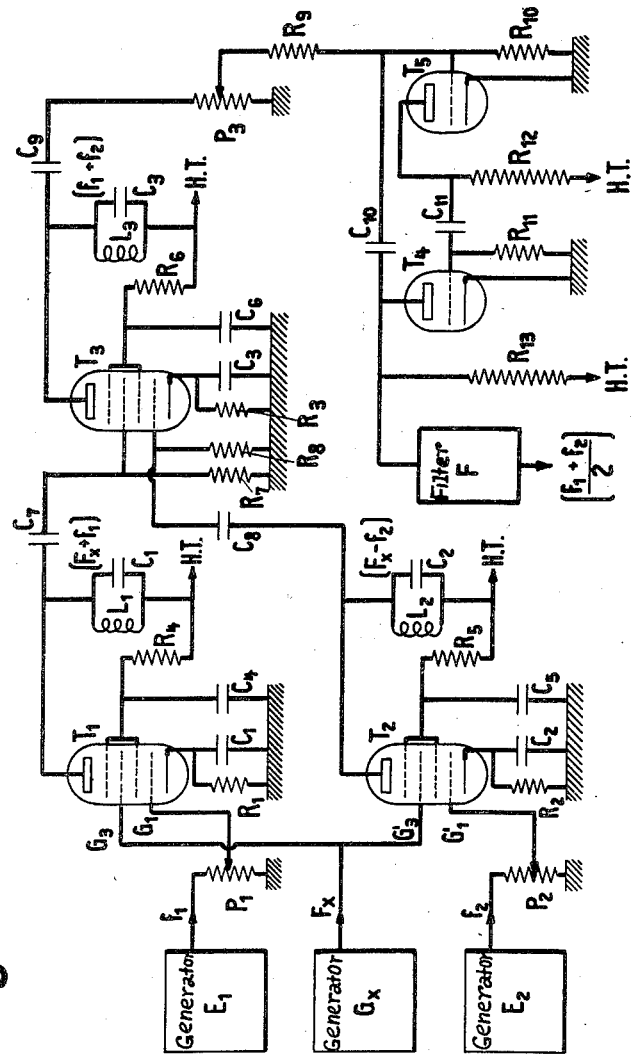

Fig. 3 shows the circuit diagram of an apparatus capable to form the mean $$\frac{f_1+f_2}{2}$$

of two frequencies $f_1$ and $f_2$.

Figure 4:
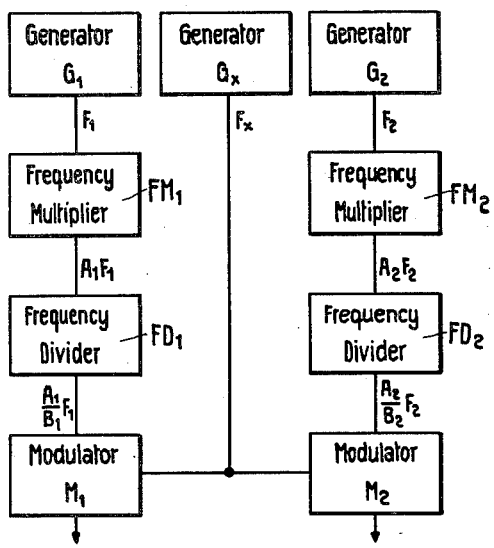
Figure 5:
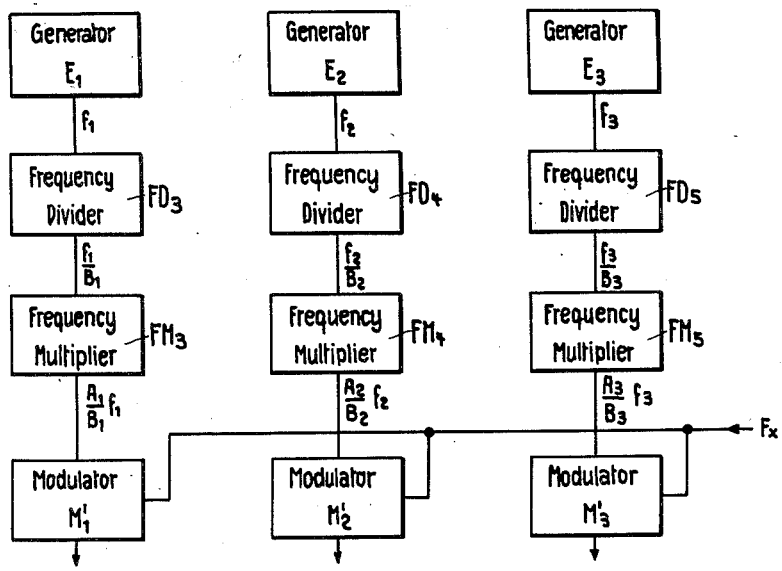

Figs. 4 and 5 are diagrams illustrating the way in which the apparatus of Figs. 1 and 2 may be combined with frequency multipliers and frequency dividers.

The frequencies $F_1$ and $F_2$ to be added to the apparatus of Fig. 1 are produced according to the above described method from two frequencies $f_1$ and $f_2$ of which latter the mean frequency is to be produced, by multiplying and dividing these frequencies in classical (not shown) equipment according to the formulas $$F_1=\frac{A_1}{B_1}f_1, \quad F_2=\frac{A_2}{B_2}f_2$$

In Fig. 1 $G_1$ and $G_2$ are frequency generators generating the frequencies $F_1$ and $F_2$ respectively, $G_x$ is the generator for the unstabilized auxiliary frequency $F_x$ and $M_1$ and $M_2$ are modulators. The frequencies $F_x$ and $F_1$ are fed into the modulator $M_1$, whereas the frequencies $F_2$ and $F_x$ are fed into the modulator $M_2$. Filters $B_1$ and $B_2$ respectively are connected to the outputs of the modulators $M_1$ and $M_2$. The filter $B_1$ is a band pass for the frequency $(F_x+F_1)$ of the frequency spectrum produced in the modulator $M_1$ and the filter $B_2$ is a band pass for the frequency $(F_x-F_2)$ of the frequency spectrum produced in the modulator $M_2$.

The frequencies $(F_x+F_1)$ and $(F_x-F_2)$ from the filters $B_1$ and $B_2$ respectively are fed into a modulator $M_4$ followed by the filter $B_4$ which is a band pass for the frequency $(F_1+F_2)$ of the frequency spectrum produced in the modulator $M_4$ from the frequencies $(F_x+F_1)$ and $(F_x-F_2)$.

In this way the sum $F_1+F_2$ of the frequencies $F_1$ and $F_2$ is obtained.

The Figures 2 and 3 show other forms of the invention, in which the frequencies are first added and then divided by the number of frequencies in order to obtain the mean frequency.

In Fig. 2 $E_1$, $E_2$ and $E_3$ are frequency generators of the same nominal frequency $f$ but generating in reality the frequencies $f_1$, $f_2$ and $f_3$ respectively differing slightly from the frequency $f$, and of which the mean frequency is to be formed by the apparatus. $G_x$ is the generator for the auxiliary frequency $F_x$.

The auxiliary frequency $F_x$ is first modulated by the frequencies $f_1$, $f_2$ and $f_3$ in the modulators $M'_1$, $M'_2$, and $M'_3$ respectively. Filters $B'_1$, $B'_2$ and $B'_3$ are connected to the modulators $M'_1$, $M'_2$ and $M'_3$ respectively isolating e. g. the frequencies $(F_x+f_1)$, $(F_x-f_2)$ and $(F_x-f_3)$ respectively.

The frequencies $(F_x+f_1)$ and $(F_x-f_2)$ are fed into the modulator $M'_4$ in which the frequency $(f_1+f_2)$ is produced amongst others. This frequency is isolated by a filter $B'_4$ and fed into a modulator $M_5$ in order to modulate the frequency $F_x$ which is also fed into this modulator. The modulator $M_5$ is connected to a band pass filter $B_5$ for the frequency $(F_x+f_1+f_2)$.

The frequencies $(F_x+f_1+f_2)$ and $(F_x-f_3)$ from the filters $B_5$ and $B'_3$ respectively are fed into another modulator $M_6$ followed by a band pass filter $B_6$ for the frequency $(f_1+f_2+f_3)$ produced amongst others in the modulator $M_6$.

The frequency $(f_1+f_2+f_3)$ is fed into a frequency divider $D$ of the ratio 3 at the output of which the frequency $$\frac{f_1+f_2+f_3}{3}$$

the arithmetical mean of the three frequencies $f_1$, $f_2$ and $f_3$ appears.

In the circuit shown in Fig. 3, which is suitable for forming the arithmetical mean of two frequencies $f_1$ and $f_2$, $E_1$ and $E_2$ are frequency generators of the same nominal frequency $f$ but generating in reality frequencies $f_1$ and $f_2$ differing slightly from the frequency $f$. $G_x$ is the generator for the auxiliary frequency $F_x$. $T_1$, $T_2$ and $T_3$ are modulator hexodes and $T_4$ and $T_5$ are triodes. $F$ is a band pass filter for the frequency $f$.

The cathodes of the tubes $T_1$, $T_2$ and $T_3$ are connected to earth by means of polarizing resistors $R_1$, $R_2$ and $R_3$ respectively, these resistors being bridged by condensers $C_1$, $C_2$ and $C_3$. The screen grids of the tubes $T_1$, $T_2$ and $T_3$ are connected to a high voltage source HT through resistors $R_4$, $R_5$ and $R_6$. The screen grids are connected to earth by means of condensers $C_4$, $C_5$ and $C_6$. Three oscillatory circuits $L_1C_1$, $L_2C_2$ and $L_3C_3$ respectively constitute the loads of the tubes $T_1$, $T_2$ and $T_3$. These loads form together with the plate resistance of the corresponding tubes band pass filters for the frequencies $(F_x+f_1)$, $(F_x-f_2)$ and $(f_1+f_2)$ respectively.

The frequencies $f_1$ and $f_2$ generated by the generators $E_1$ and $E_2$ are fed to the grids $G_1$ and $G'_1$ of the tubes $T_1$ and $T_2$ respectively after being brought to a suitable voltage in the potentiometers $P_1$ and $P_2$. The frequency $F_x$ is applied to the grids $G_3$ and $G'_3$ of the tubes $T_1$ and $T_2$.

The frequencies $(F_x+f_1)$ and $(F_x-f_2)$ appearing on the plates of the tubes $T_1$ and $T_2$ respectively are fed through condensers $C_7$ and $C_8$ to the grids $G''_3$ and $G''_1$ of the modulator tube $T_3$. The resistors $R_7$ and $R_8$ are the grid leak resistors of the grids $G''_1$ and $G''_3$. Due to the modulation of the frequencies $(F_x+f_1)$ and $(F_x-f_2)$ in the tube $T_3$ and due to the filter formed by the oscillatory circuit $L_3C_3$ together with the plate resistance of the tube $T_3$ the frequency $(f_1+f_2)$ appears on the plate of $T_3$.

This frequency $(f_1+f_2)$ serves for synchronizing a multivibrator through the condenser $C_9$, the potentiometer $P_3$ and the resistor $R_9$. This multivibrator is formed by the tubes $T_4$ and $T_5$. The plate of tube $T_4$ is connected to the grid of tube $T_5$ by means of a condenser $C_{10}$ this grid being connected to earth by a resistor $R_{10}$. The plate of tube $T_5$ is connected to the grid of tube $T_4$ by means of a condenser $C_{11}$, this grid being connected to earth by a resistor $R_{11}$. The cathodes of the tubes T4 and T5 are directly earthed. The plates of these tubes are fed from the high voltage source HT through resistors R12 and R13.

The condensers C10 and C11 and the resistors R10 and R11 are so designed that the multivibrator T4, T5 is freely oscillating at a frequency slightly below the frequency $f$. If, however, the multivibrator is synchronized by the frequency $(f_1+f_2)$ of suitable amplitude it will oscillate at the frequency $$\frac{f_1+f_2}{2}$$

which is very close to the frequency $f$. If required, this frequency $$\frac{f_1+f_2}{2}$$

appearing on the plate of the tube T4 may be freed from its harmonic oscillations in a filter F connected to the plate T4.

Figs. 4 and 5 illustrate the way in which linear combinations of the type $$F_m = \frac{A_1}{B_1}f_1 + \frac{A_2}{B_2}f_2 + \ldots + \frac{A_n}{B_n}f_n$$

may be obtained from frequencies $f_1, f_2, \ldots f_n$ generated in generators of different frequency stability. The circuits of Figs. 4 and 5 correspond to the circuits of Figs. 1 and 2 respectively but differ from those circuits in that frequency dividers and multipliers are inserted between the generators and the first modulators.

Fig. 4 shows a circuit for forming a mean of two frequencies F1 and F2 generated in generators G1 and G2 respectively. The frequency F1 from G1 is applied to a frequency multiplier FM1 of well known type having a multiplying ratio A1. The frequency F1A1 resulting from this frequency multiplication is fed to a frequency divider FD1 of well known type having a dividing ratio B1 so that a frequency $$\frac{A_1}{B_1}F_1$$

will result from this frequency divider, this frequency being fed to a modulator M1 in which this frequency is intermodulated with the auxiliary frequency Fx from the generator Gx. In the same manner the frequency F2 generated in the generator G2 is multiplied by a factor A2 in a frequency multiplier FM2 and the frequency A2F2 resulting from this frequency multiplication is divided in a frequency divider FD2 by a factor B2 so that a frequency of $$\frac{A_2}{B_2}F_2$$

is fed to the second modulator M2 in which it is intermodulated with the auxiliary frequency Fx. The modulators M1 and M2 correspond to the modulators M1 and M2 of the circuit illustrated in Fig. 1 and the frequencies are then added in the manner described with reference to Fig. 1 for forming the linear frequency combination $$F_m = \frac{A_1}{B_1}F_1 + \frac{A_2}{B_1}F_2$$

Fig. 5 illustrates a part of a circuit similar to the circuit shown in Fig. 4 but for forming a linear combination of three frequencies $f_1$, $f_2$ and $f_3$ generated in generators of different stability E1, E2 and E3. These generators as well as the modulators M'1, M'2 and M'3 shown in Fig. 5 correspond to the same elements of the circuit shown in Fig. 2. The frequencies $f_1$, $f_2$, $f_3$ are first divided in frequency dividers FD3, FD4 and FD5 by factors B1, B2 and B3 respectively and are then multiplied in frequency multipliers FM3, FM4 and FM5 respectively by factors A1, A2 and A3 respectively for producing frequencies $$\frac{A_1}{B_1}f_1, \frac{A_2}{B_2}f_2 \text{ and } \frac{A_3}{B_3}f_3$$

which are fed to the modulators M'1, M'2 and M'3 respectively where they are intermodulated with the auxiliary frequency Fx. The frequencies are then added in a circuit similar to the one shown in Fig. 2 in the manner described with reference to Fig. 2 for forming the linear frequency combination $$F_m = \frac{A_1}{B_1}f_1 + \frac{A_2}{B_2}f_2 + \frac{A_3}{B_3}f_3$$

While I have illustrated and described in detail certain forms of the invention, it is to be understood that changes may be made therein and the invention embodied in other structures. I do not, therefore, desire to limit myself to the specific constructions illustrated, but intend to cover my invention broadly in whatever form its principles may be embodied.

What I claim is:

1. In a system for forming a linear frequency combination from a number of initial frequencies, a frequency divider and a frequency multiplier connected in cascade for each of the said initial frequencies, each of the said initial frequencies being divided and multiplied in one of the said frequency dividers and frequency multipliers respectively whereby a changed frequency results for every initial frequency, an oscillator producing an auxiliary frequency, at least one frequency adding circuit each comprising modulator means for so combining two of the said changed frequencies with the said auxiliary frequency that sum and difference frequencies of the said auxiliary frequency and each one of the said changed frequencies are generated, two filter means for selecting a sum frequency and a difference frequency respectively, modulator means for so combining the said selected sum frequency and difference frequency that a sum and a difference beat frequency are produced and an output filter means for selecting the said difference beat frequency which equals the sum of two of the said changed frequencies, a number of frequency adding circuits being provided for adding all the said changed frequencies and partial sums of changed frequencies so that the total sum of all the said changed frequencies is formed.

2. In a system for forming a linear frequency combination from a number of initial frequencies, frequency changers comprising a frequency divider and a frequency multiplier connected in cascade, one frequency changer being provided for each of the said initial frequencies and each of the initial frequencies being changed to an intermediate frequency in one of the said frequency changers, at least one frequency adding circuit for adding two frequencies and comprising first modulator means, first filter means connected to the output of the first modulator means, second modulator means connected to the output of the first filter means and second filter means connected to the output of the second modulator means, an oscillator generating an auxiliary frequency, each two of the said intermediate frequencies being so combined with the said auxiliary frequency in the said first modulator means that two sum and two difference frequencies are generated, one sum frequency being selected in one of the said first filter means and one difference frequency being selected in another of the said first filter means, a so selected sum frequency and difference frequency being so combined in the said second modulator means that the sum beat frequency and the difference beat frequency are generated and the difference beat frequency which equals the sum of two intermediate frequencies being selected by the said second filter means, a number of adding circuits being provided sufficient for adding each two of the said intermediate frequencies to form a partial sum of two intermediate frequencies and for further adding partial sums of intermediate frequencies with at least one intermediate frequency to form the total sum of all the intermediate frequencies.

3. In a system for forming a linear frequency combination from a number of initial frequencies independently generated in individual frequency generators, one frequency changer being provided for each initial frequency for changing it by a rational coefficient to form an intermediate frequency, and means for adding all of the said intermediate frequencies for forming a linear combination from the said initial frequencies.

4. In a system for producing a highly stable frequency, a number of individually operating frequency generators operating at the same nominal frequency, a frequency changer comprising the cascade connection of a frequency divider and a frequency multiplier connected to each of the said frequency generators, each generator frequency being changed in one of the said frequency changers, the sum of the changing ratio of the said frequency changers being 1 and the changing ratios being different for at least some of the frequency changers, all the output frequencies from the frequency changers being added to form a highly stable frequency combination from the said generator frequencies.

5. In a system for producing a highly stable frequency, a number of individually operating frequency generators, a frequency changer comprising the cascade connection of a frequency divider and a frequency multiplier for each of the said frequency generators, each generator frequency being changed in one of the said frequency changers by a coefficient determined by the ratios of the frequency divider and frequency multiplier of the frequency changer, all the output frequencies from the frequency changers being added to form a frequency combination from the said generator frequencies.

6. In a system for producing a frequency of high stability, at least two individually operating frequency generators producing each an initial frequency, each of the said generators being connected to a frequency changer comprising a frequency divider and a frequency multiplier in casacde connection, each of the said initial frequencies being changed in one of the said frequent changers by a ratio determined by the dividing ratio of the said frequency divider and the multiplying ratio of the said frequency multiplier for producing an intermediate frequency from each of the said initial frequencies, and a frequency adding circuit adapted for addition of a number of independent frequencies equal to the number of intermediate frequencies, all of the said intermediate frequencies being added up in the said frequency adding circuit for forming a frequency combination of high stability from the said initial frequencies.

7. In a system for producing a frequency of high stability, at least two individually operating frequency generators producing each an initial frequency, each of the said generators being connected to a frequency changer, each of the said initial frequencies being changed in one of the said frequency changers by a predetermined ratio for producing an intermediate frequency from each of the said initial frequencies, and a frequency adding circuit adapted for adding a number of frequencies equal to the number of intermediate frequencies, all of the said intermediate frequencies being added up in the said frequency adding circuit for forming a frequency combination of high stability from the said initial frequencies.

8. In a system for forming a linear frequency combination from a number of initial frequencies, a number of frequency changers, one frequency changer being provided for each of the said initial frequencies and each of the initial frequencies being changed to an intermediate frequency in one of the said frequency changers, at least one frequency adding circuit for adding two of the said intermediate frequencies and comprising modulator means for intermodulating two of the said intermediate frequencies and filter means for selecting the sum of the said two intermediate frequencies, a number of adding circuits being provided sufficient for adding each two of the said intermediate frequencies to form a partial sum of two intermediate frequencies and for further adding partial sums of intermediate frequencies with at least one intermediate frequency to form the total sum of all the intermediate frequencies.

9. In a system for forming a linear frequency combination from a number of initial frequencies, at least one frequency adding circuit for adding two frequencies and comprising first modulator means, first filter means connected to the output of the first modulator means, second modulator means connected to the output of the first filter means and second modulator means, an oscillator generating an auxiliary frequency, each two of the said initial frequencies being so combined with the said auxiliary frequency in the said first modulator means that two sum and two difference frequencies are generated, one sum frequency being selected in one of the said first filter means and one difference frequency being selected in another of the said first filter means, a so selected sum frequency and difference frequency being so combined in the said second modulator means that the sum beat frequency and the difference beat frequency are generated and the difference beat frequency which equals the sum of two intermediate frequencies being selected by the said second filter means, a number of adding circuits being provided sufficient for adding each two of the said initial frequencies to form a partial sum of two initial frequencies and for further adding partial sums of initial frequencies with at least one initial frequency to form the total sum of all the initial frequencies.

10. In a system according to claim 9 a frequency divider having a dividing ratio equal to the number of initial frequencies added, the said total sum of all the initial frequencies being fed to the said frequency divider and divided in the same.

References Cited in the file of this patent

UNITED STATES PATENTS

| | | |
|---|---|---|
| 2,405,765 | Smith | Aug. 13, 1946 |
| 2,602,159 | Wirkler | July 1, 1952 |
| 2,617,039 | Young | Nov. 4, 1952 |
| 2,735,983 | McLeod | Feb. 21, 1956 |

FOREIGN PATENTS

| | | |
|---|---|---|
| 890,233 | France | Feb. 2, 1944 |
| 410,663 | Italy | Apr. 19, 1945 |
| 625,358 | Great Britain | June 27, 1949 |